(12) United States Patent
Morita et al.

(10) Patent No.: US 7,146,872 B2
(45) Date of Patent: Dec. 12, 2006

(54) MICRO MANIPULATOR

(75) Inventors: Kazuhiro Morita, Nishiibaraki (JP); Motohide Ukiana, Hitachinaka (JP); Kazuhiro Fujii, Hitachinaka (JP); Shigeto Isakozawa, Hitachinaka (JP); Hidemi Koike, Hitachinaka (JP); Tamio Tanikawa, Tsukuba (JP)

(73) Assignees: Hitachi, Ltd., Tokyo (JP); Hitachi Science Systems, Ltd., Hitachinaka (JP); National Institute of Advanced Industrial Science and Technology, Tokyo (JP)

( * ) Notice: Subject to any disclaimer, the term of this patent is extended or adjusted under 35 U.S.C. 154(b) by 493 days.

(21) Appl. No.: 10/214,196

(22) Filed: Aug. 8, 2002

(65) Prior Publication Data

US 2003/0056364 A1 Mar. 27, 2003

(30) Foreign Application Priority Data

Aug. 23, 2001 (JP) ............................. 2001-253389

(51) Int. Cl.
*B25J 17/00* (2006.01)
(52) U.S. Cl. ............................. 74/490.06; 74/490.07; 901/29; 414/729
(58) Field of Classification Search ............. 74/490.01, 74/490.09, 490.07; 901/16, 14, 15, 27, 28; 414/729; 251/118, 337
See application file for complete search history.

(56) References Cited

U.S. PATENT DOCUMENTS 5,668,432 A * 9/1997 Tominaga et al. .......... 310/328
5,727,391 A * 3/1998 Hayward et al. ............. 60/528
6,501,210 B1 * 12/2002 Ueno ........................ 310/331
6,675,671 B1 * 1/2004 Jokiel et al. ............. 74/490.09
2003/0192179 A1 * 10/2003 Johnstone .................... 29/834
2004/0021123 A1 * 2/2004 Howell et al. .............. 251/337
2004/0056742 A1 * 3/2004 Dabbaj ........................ 335/78
2004/0134250 A1 * 7/2004 Durney et al. ................ 72/324

FOREIGN PATENT DOCUMENTS

EP 0 625 410 A1 11/1994

(Continued)

OTHER PUBLICATIONS

Tanikawa et al., " 3DOF Micro Parallel Mechanism of Folded Thin Plate." Lecture Translations of the 2001 Annual Meeting of the Japan Society of Mechanical Engineer. ( Aug. 27-30, 2001, vol. IV, No. 01-1).

(Continued)

*Primary Examiner*—David Fenstermacher
(74) *Attorney, Agent, or Firm*—Dickstein Shapiro LLP (57) ABSTRACT

Provision of a 3-DOF micro manipulator easy to operate and capable of executing accurate positioning, wherein the link mechanisms of the micro manipulator whose main operation is parallel 3-DOF operation are implemented by cutting, folding, and moding a sheet of metal plate. Base and end effector are connected by three link mechanisms. The three link mechanisms are manufactured by cutting and folding a flexible plate material, and are equipped with plate-like arm portions each having a spread in the axially peripheral direction of the end effector, with hinge portions that are formed longitudinally across each arm portion in order to function as revolving joints R, and with a hinge portion also formed at the middle position of the arm portion in order to function as revolving joints R. Also, a parallelogrammatic link is formed between one longitudinal end of the arm portion and the middle portion thereof in order to function as a prismatic joint pair P.

8 Claims, 6 Drawing Sheets

FOREIGN PATENT DOCUMENTS

| | | |
|---|---|---|
| JP | 8-132363 | 5/1996 |
| JP | 09-105448 | 4/1997 |
| JP | 10-138177 | 5/1998 |
| JP | 10138177 A | 5/1998 |

OTHER PUBLICATIONS

Japanese Office Action, Mailed date Aug. 30, 2005.

* cited by examiner

A SIDE VIEW      A FRONT VIEW

FIG. 7

MICRO MANIPULATOR

BACKGROUND OF THE INVENTION

1. Field of the Invention

The present invention relates to a micro manipulator that can be used in biotechnology, medicine, semiconductor integrated-circuit manufacture/inspection, and other industrial applications which require micro-operations, and more particularly to a micro manipulator capable of performing micro-operations accurately and easily, such as the positioning, transfer, cutting, and bonding of very small objects, or suitable for application to an accurate sample-mounting stage positioning mechanism or the like.

2. Prior Art

An example of a 3-DOF (three-degree-of-freedom) micro manipulator suitable for the micro-operations under a microscope is described in Japanese Application Patent Laid-Open Publication No. Hei 10-138177 (published in 1998).

The above prior art relates to a 3-DOF micro manipulator that was developed with focus placed on the fact that during the micro-operations under a microscope, parallel 3-DOF operation in three axial directions orthogonal to each other is the main operation of the micro manipulator. Three link mechanisms for connecting the base and end effector of the micro manipulator are provided to implement 3-DOF accurate positioning control of the end effector.

The above link mechanisms have revolving joints (rotating pair) and prismatic joints. These joints are combined into 4-DOF link mechanism as an RRPP mechanism (R and P stand for revolving joint and prismatic joint, respectively), RPRP mechanism, PRPR mechanism and RPPR mechanism. Three such 4-DOF link mechanisms are arranged in parallel, in order to enable the end effector to operate with three degree of freedom. Also, the flexure (flexible) hinge portions of the revolving joints and the connecting link portions of the prismatic joints are thinned down at both ends of each portion to ensure that the revolving joints and the prismatic joints accomplish their intended purposes.

The above-described prior art has the advantages that the flexure hinge portions or the like requires no ball joints or the like and that the simplification of components, and even of the mechanisms, can be achieved. However, detailed methods are not proposed about how the flexible structure for constituting the link mechanisms of the micro manipulator can be manufactured at lower costs and into smaller dimensions, about what type of material should be used for the structure, or about the layout of the actuators to be used to form a driving mechanism for the structure. The use of piezoelectric elements in the driving mechanisms for each link is proposed.

SUMMARY OF THE INVENTION (Problems to be Solved by the Invention)

An object of the present invention is to provide a 3-DOF micro manipulator that can grip a very small object and perform micro-operations accurately and easily or that can be applied to an accurate positioning stage mechanism or the like and enables easy and highly accurate positioning.

Another object of the present invention is to provide a micro manipulator that can conduct parallel 3-DOF control of its end effector in three axial directions by use of three link mechanisms, wherein the link mechanisms can be constructed by cutting and folding with a press or the like and the micro manipulator itself can be manufactured into the smallest possible dimensions, at the lowest possible costs, and easily.

(Means for Solving the Problems)

In order to solve the problems described above, the present invention proposes a micro manipulator basically equipped with three link mechanisms for connecting its base and its end effector, and performing parallel 3-DOF operation, wherein the above-mentioned three link mechanisms are fabricated into a single unit by cutting and folding a sheet of flexible metal plate.

The present invention also proposes a micro manipulator equipped with three link mechanisms for connecting its base and its end effector, wherein the micro manipulator is characterized in that said three link mechanisms are produced by fabricating a sheet of flexible metal plate and are formed with plate-like arm portions having a spread in the axially peripheral direction of said end effector, flexure hinge portions that are positioned between both ends and middle position of each said arm portion in its longitudinal direction and can be regarded as revolving joints if the amounts of displacement of the flexure hinge portions are very small, and link elements that are positioned between one end and middle position in the longitudinal direction of each said arm portion and can be regarded as a prismatic joint if the amount of displacement of the link element is very small.

It is possible, by adopting such construction as set forth above, to realize link mechanisms produced by fabricating a flexible metal plate and each provided with, for example, three flexible hinge portions that can be regarded as revolving joints R if the amounts of displacement of the flexible hinge portions are very small, and one parallelogrammatic link portion that can be regarded as a prismatic joint P if the amount of displacement of the link portion is very small.

When a set of 4-DOF link mechanisms is to be constructed by combining prismatic joints (P) and revolving joints (R), this is possible by adopting either a configuration that uses three R joints and one P joint, or a configuration that uses two R joints and two P joints. According to the present invention, a set of 4-DOF link mechanisms enabling an end plate, even an end effector, to move with three degrees of freedom in three axial directions, can be realized by cutting a thin sheet of metal plate, then after folding and stereographically building up this sheet into three-piece parallel arrangement form, and pushing it upward with a piezoelectric element. Even if orientation is to be changed between the hinge portions of the revolving joints and the hinge portions used at the link elements of the prismatic joints, in particular, the desired orientation can be easily implemented by folding the plate material. The section on the preferred embodiments of the present invention describes details of this implementing method by use of FIGS. 4 and 5.

The above-outlined set of three link mechanisms can be constructed by fabricating into a single unit with cutting (punching) and folding (bending) a sheet of metal plate, or by fabricating a metal plate into independent upper and lower plate in the same way, and assembling these upper and lower plate . The use of such a sheet-metal unification tool by pressing, enables not only micro-link mechanisms to be formed, but also a micro-machine to be assembled by utilizing the micro-operations of the manipulator thus realized. The micro manipulator pertaining to the present invention can also be manufactured by micro-processing based on the state-of-the-art photoetching technology.

DESCRIPTION OF THE PREFERRED EMBODIMENTS

The preferred embodiments of the present invention are described below using drawings.

Figure 1:
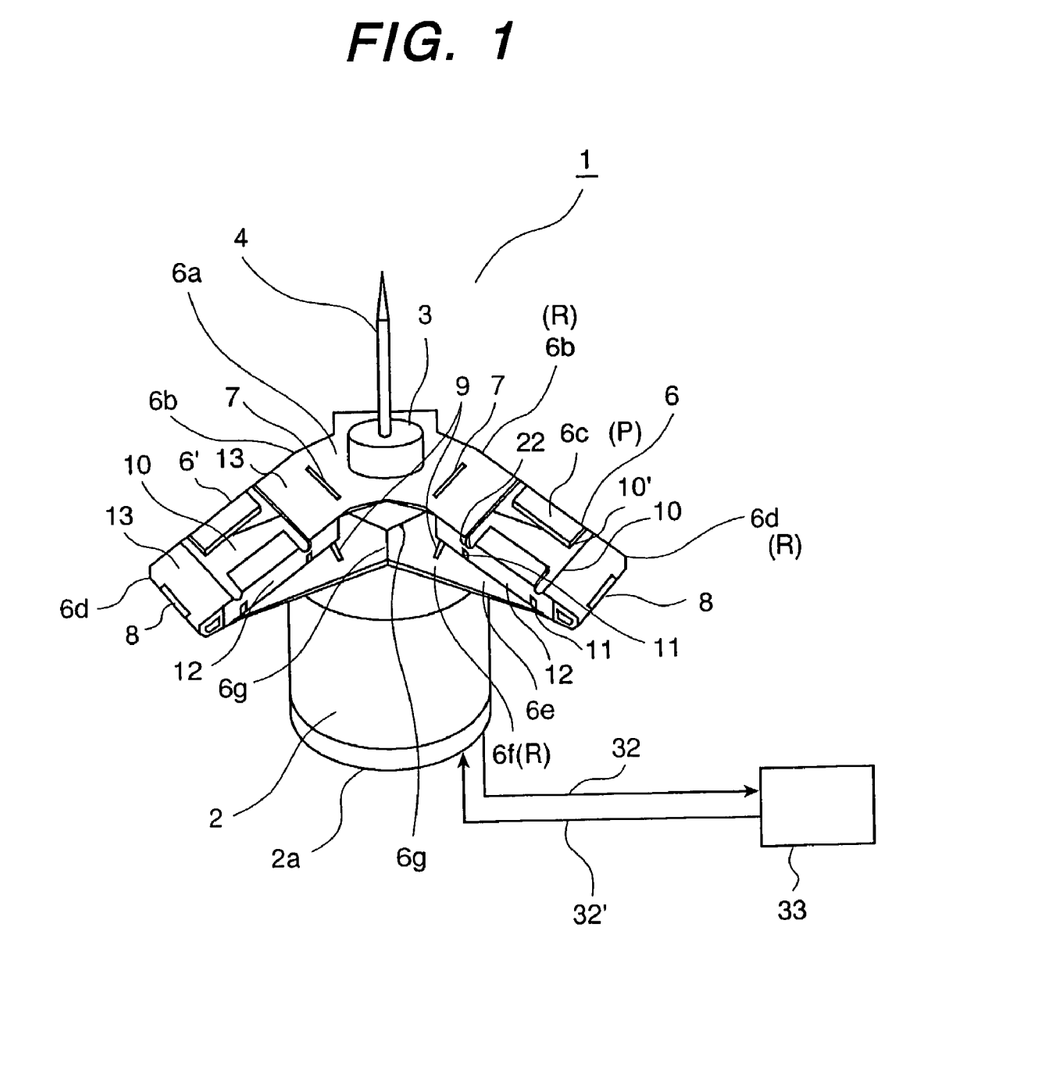
FIG. 1 is a diagonal view of the micro manipulator pertaining to a first embodiment of the present invention.

The micro manipulator 1 shown in FIG. 1 is usually used independently or combining more than one or combining different forms of manipulator elements. When the micro manipulator is used combining more than one or different forms of manipulator elements (each equipped with a needle), needle 4 can operate in chopstick-like motion and it can pick and transport a very small object by micro-operating.

Figure 6A:
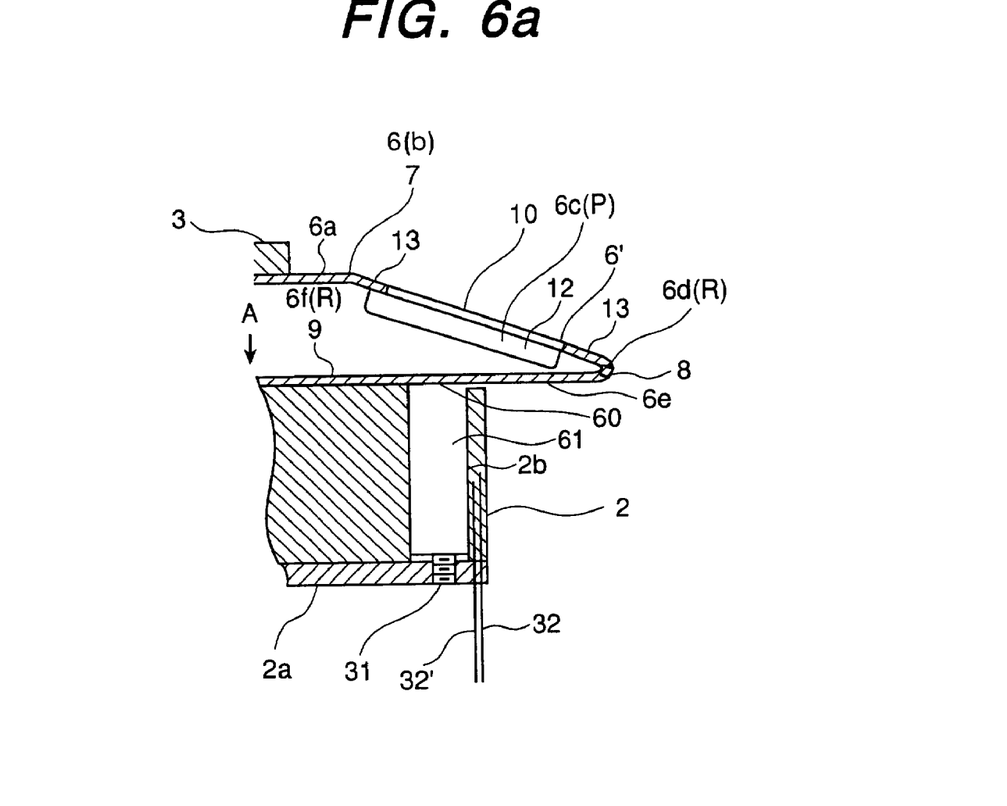
FIGS. 6a and 6b are sectional views showing the mechanism for driving one link mechanism used in the first embodiment, and also a partial plan view of the section A of the above-mentioned driving mechanism.

Micro manipulator 1 has: a base 2 constructed by a cylindrical body which contains an actuator (for example, the piezoelectric element 61 shown in FIG. 6); an end effector 3 with a needle 4; and three link mechanisms 6 for connecting the base 2 and the end effector 3.

The three link mechanisms 6 pertaining to this embodiment are produced by fabricating a flexible thin plate (such as a spring material of phosphor bronze) into a single unit. A movable plate 6a for installing the end effector 3 is provided at the top of the link mechanisms 6, and three plate-like arm portions 6' constituting the main unit of a link element are arranged facing in three directions at angle intervals of 120° around the axis of the movable plate 6a (end effector 4) in order to integrally operate therewith.

Figure 3:
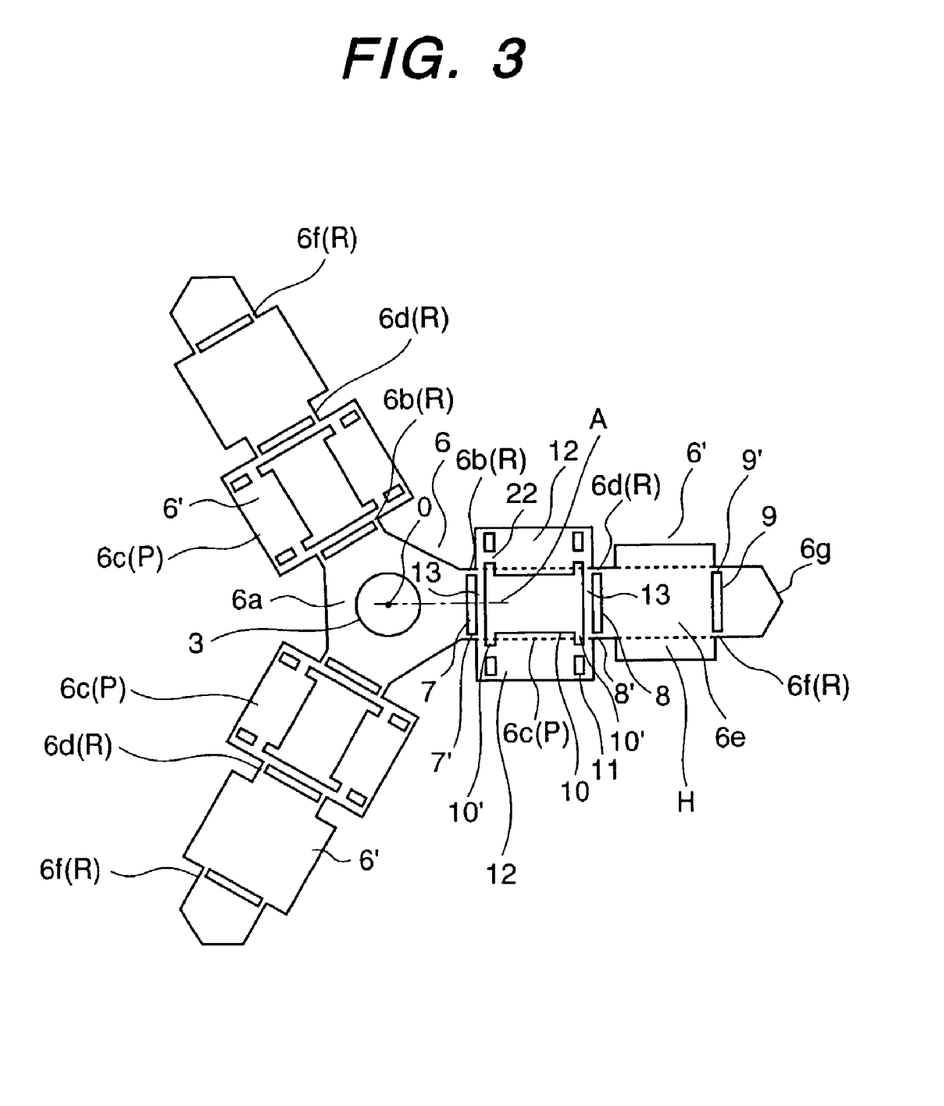
FIG. 3 is a development of the three link mechanisms used for the above-mentioned.

In the development view of FIG. 3, the three arm portions 6' are oriented in different directions. When assembled, however, each arm portion 6' is folded into a V-shape at its middle position 6d, with one end of the arm portion being connected to the movable plate portion 6a and the other end 6g being secured in proximity to the center of the upper face of the base 2. In this embodiment, the ends 6g of the three arm portions 6' are cut to the angle of 120° at the tip of each so as to enable face each other without a clearance.

The three arm portions 6' are installed in folded form at the respective middle positions on base 2. When assembled, therefore, the arm portions are oriented toward three directions from the positions of the end effector 3 (movable plate portion 6a) and base 2, as shown in FIG. 1. Also, the arm portions 6' are of a plate-like shape and have a spread around the axis of the end effector 3 (movable plate 6a).

The principles of operation of the revolving joints R and prismatic joints P formed at each arm portion 6' are described below using FIGS. 4 and 5.

Figure 4A:
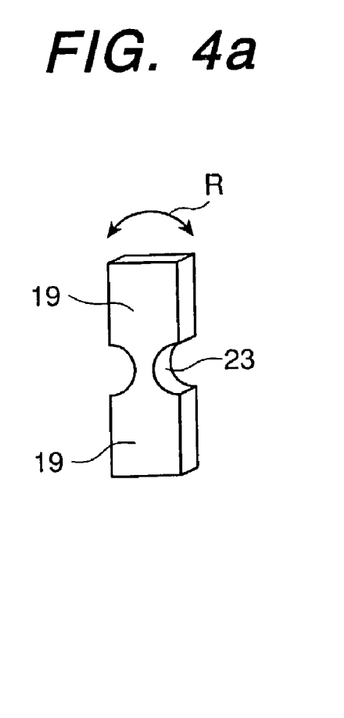
FIGS. 4a and 4b are diagrams showing the principles of operation of the elements of one revolving joint pair R and one prismatic joint pair P.

Revolving joints R can be formed by, as shown in FIG. 4(a), connecting one pair of joint members 19 by means of thin portions (constrictions) 23. That is to say, if the displacement of the arc hinge shown in FIG. 4(a) is very small, this hinge portion can be regarded as a revolving joint (rotating pairs) R having one degree of freedom.

Figure 4B:
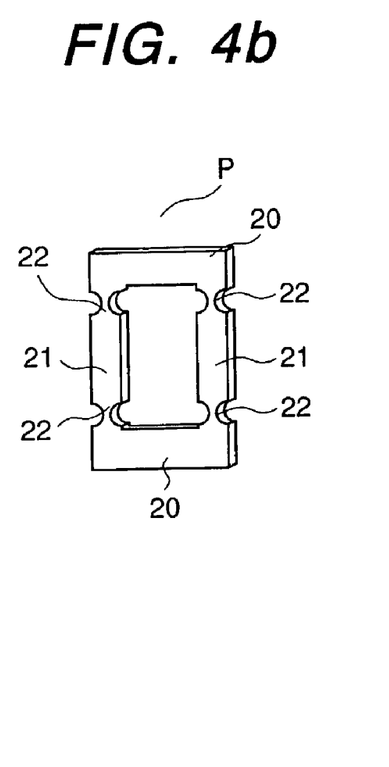

As shown in FIG. 4(b), the flexible structure (parallelogrammatic link) for implementing a prismatic joint P can be formed, one pair of parallel joint members (upper and lower sides) 20 are connected via the respective thin portions (constrictions) 22 by means of one pair of connecting link portions (left and right sides) 21. That is to say, although the shape of such structure as shown in FIG. 4(b), if significant in displacement, follows a circular orbit centering on bottom hinges (thin portions) 22, the structure, if very small in displacement, can be regarded as a prismatic joint P having one degree of freedom.

When using three link mechanisms to design a 3-DOF parallel mechanism, the combination of these R and P joints can realize parallel 3-DOF operation. When manufactured, however, this mechanism is difficult to process, since it requires hinges oriented in at least two directions.

Figure 5A:
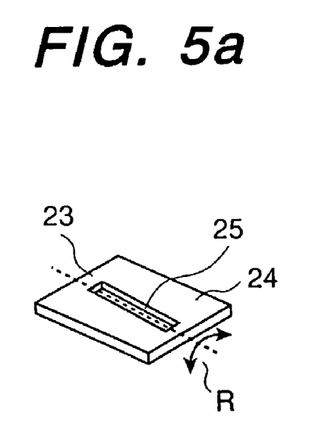
FIGS. 5a and 5b are diagrams showing the principles of operation of the elements of the revolving joints R and prismatic joints P pertaining to the first embodiment.

Here, it is possible, by cutting a slit 25 through a thin sheet of metal plate 24 as shown in FIG. 5(a), to form a hinge (narrow portion) 23 at both edges of the slit 25 and easily construct revolving joints R.

Figure 5B:
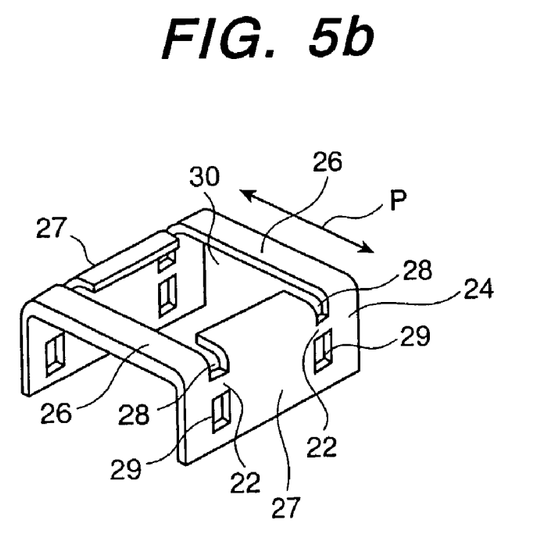

Also, it is possible, by combining a bending process with the cutting process for a thin sheet of metal plate 24 as shown in FIG. 5(b), to change the directions of hinges (constrictions) 22 and easily construct a prismatic joint P equivalent to one shown in FIG. 4(b). In FIG. 5(a), it is possible to form constrictions 22 and to change the directions thereof, by cutting square holes 30 (the corners of there holes are cut in the shape of slits 28) and small slits 29 (arranged in the lateral direction of the slits 28) through a thin sheet of metal plate and bending the side plate portions 27 thereof. The pair of side plate portions 27 function as the connecting link portions (equivalent to the connecting link portions 21 shown in FIG. 4) that connect one pair of joints 26 (equivalent to the pair of joints 20 shown in FIG. 4).

In this embodiment, the link elements (revolving joints R and prismatic joints P) shown in FIGS. 5(a) and (b) are combined to construct link mechanisms 6. A development of the link mechanisms is shown as FIG. 3, and an as-assembled view of the link mechanisms is shown as FIG. 1.

In this embodiment, as shown in FIGS. 1 and 3, lateral slits 7 and 9 are configured to the both ends in the longitudinal direction of each plate-like arm portion 6' oriented in three directions. A lateral slit 8 is also configured at the middle position of each such arm portion. After the slits 7, 8, and 9 have been formed, each arm portion is folded at the position of the slits 7 and 8. By forming these slits in this way, the sections 7', 8', and 9' that have been reduced in substantial plate width constitute hinges 6b, 6d, and 6f, respectively, thus forming a total of three revolving joints R equivalent to those of FIG. 5(a). The slits can take various forms, and actual forms are not limited by the forms shown in this embodiment.

Square holes 10 (having notch-like slits 10' extended laterally at corners) and slits 11 are formed between one longitudinal end of the arm portion 6' (in this embodiment, one end at the side connected to the movable plate 6a) and the middle portion 6d. The notches 10' and the slits 11 correspond to the slits denoted by numerals 28 and 29, respectively, in FIG. 5(*b*), and hinges 22 are formed between the slits 10' and the slits 11.

As shown in FIG. 3, side plate portions 12 are formed at the lateral left and right ends of each arm portion 6'. These side plate portions 12 are folded at the positions of the broken lines H in FIG. 3 and correspond to the connecting link portions 27 in FIG. 5(*b*). The notch-like slits 10' are extended so as to intersect with the folding lines H. The side plate portions 12 can be folded to change the directions of the hinges 22.

Numeral 13 corresponds to the pair of joints 26 shown in FIG. 5(*b*). That is to say, one pair of side plate portions (connecting link portions) 12 and one pair of joints 13 constitute a parallelogrammatic link 6*c*. The parallelogrammatic link 6*c*, if very small in displacement, can be regarded as a prismatic joint P.

Figure 2A:
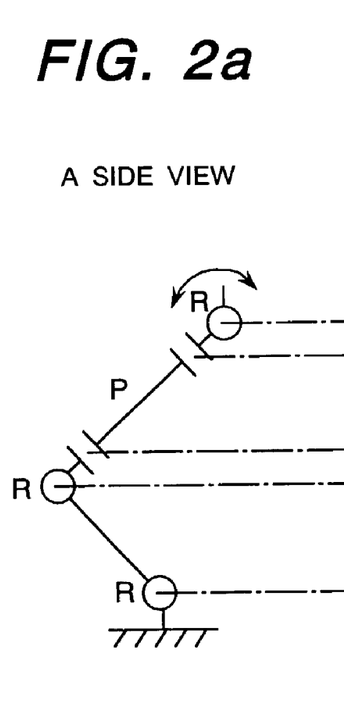
FIGS. 2a and 2b are diagrams showing the principles of operation of one link mechanism used for the above-mentioned micro manipulator.
Figure 2B:
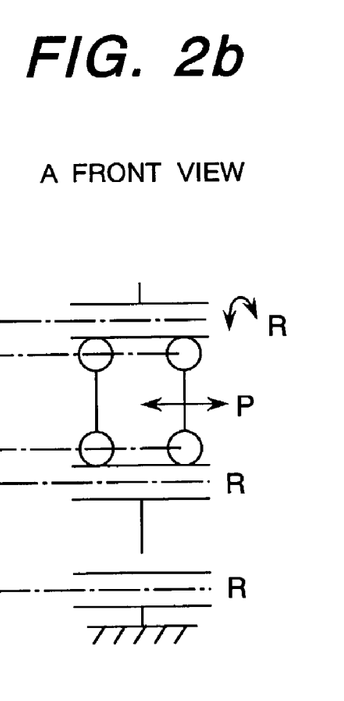

When produced by fabricating a flexible plate (thin plate), each link mechanism 6 of the above-described configuration will have three revolving joints R and one prismatic joint P. FIG. 2 is a schematic diagram showing a combination of the revolving joints R and prismatic joints P pertaining to this embodiment, wherein FIG. 2(*a*) shows the joint mechanism when viewing the link mechanisms of FIG. 1 from the side, and FIG. 2(*b*) shows the joint mechanism when viewing the link mechanisms from front.

As shown in FIG. 2, in this embodiment, tri-axial-3-DOF motions can be assigned to the end plate 6*a* by constructing three link mechanisms (each functioning as an RPRR mechanism), and pushing the lower part of each such link mechanism by a piezoelectric device.

Next, the driving mechanism for the manipulator (link mechanisms) in this embodiment is described below using FIG. 6.

Figure 6B:
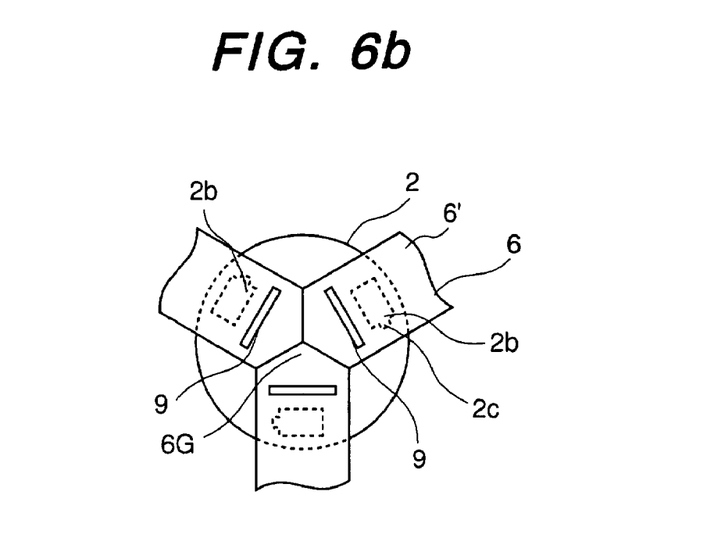

As shown in FIG. 6, a piezoelectric device, for example, is used as each actuator 61 for driving the manipulator. Depending on the number of link mechanisms 6, three piezoelectric devices 61 are provided. Piezoelectric devices 61 are arranged in the base (cylindrical body) 2 at intervals of 120° at the circumference of an axis.

That is to say, piezoelectric elements 61 are arranged at the positions corresponding to each link mechanism (arm portion 6'). The base 2 is provided holes 2*b* oriented in its axial direction so as to be positioned at the reverse side of the arm portion 6', and each piezoelectric device 61 is inserted in each hole 2*b*. Also, as shown in FIG. 6(*b*), lead wire pullout grooves 2*c* for the piezoelectric devices 61 are formed in addition to the holes 2*b*.

Each piezoelectric device 61 has one end (upper end) supported by the reverse side 60 of the bottom 6*e* of the arm portion 6'. The other end (lower end) of the piezoelectric device 61 is held by base plate 2*a* and the piezoelectric device 61 is preloaded by a screw 31 so that a clearance does not occur at the contact surface between piezoelectric device 61 and supporting side 60.

Each joint is constructed so that when the three piezoelectric devices 61 are expanded/contracted or the degree of the expansion/contraction is varied for each piezoelectric devices 61 according to the particular control signal, the supporting side 60 of the link mechanism 6 will be pressed to drive the joint.

To ensure that the thermal balance of the base 25 is maintained even in case of thermal expansion due to the heat from the piezoelectric devices 61, it is desirable that the base 25 be made of a material whose linear expansion coefficient is approximately the same as, or close to, that of the piezoelectric device 61.

In the micro manipulator 1 pertaining to this embodiment, the three link mechanisms 6 each constituting the RPRR mechanism shown in FIG. 2 are symmetrically arranged between base 2 and end effector 3 at intervals of 120° around the central axis of the micro manipulator 1. A laminated type, for example, is used for the piezoelectric device 61.

Numerals 32 and 32' denote the lead wires that supply a voltage to actuator 61. The piezoelectric device used as actuator 61, is rapid in response, very small in displacement, and provides high output. With open-loop control based only on driving voltage, however, the piezoelectric device is difficult to accurately position because of its extremely large hysteresis. For this reason, feedback control based on measurement of its displacement is desirable and in this case, particularly compact displacement measuring means and servo driving system are required.

A strain gauge can be used as such a displacement measuring means (the strain gauge in this case is not shown in the figure) directly attached to an actuator 61 in the direction of its expansion/contraction. And as denoted by numeral 33, a software servo using a computer or an analog servo using an operational amplifier can be used as the servo system for the piezoelectric devices.

Command signals from a servo system control circuit 33 are sent to actuators (piezoelectric devices) 61 via lead wires 32 and 32'.

The three actuators 61 are driven to push the supporting sides 60 that are the contact portions against link mechanisms 6, and thus to move end effector 3 through the required distance in order to implement micro-operations. These micro-operations are accomplished by, after detecting the amount of displacement of each actuator 61 from the strain gauge and calculating the current position of a needle (finger piece) 5 from the detected amount of displacement by use of the servo control circuit 33, feeding back calculated position data, then comparing this data with the required positioning command data, and servo-driving the actuator 61 until no deviations have occurred.

Although the supply of voltage to piezoelectric device 61 generates heat in the piezoelectric device itself and thermally expands it, since the heat flows out into cylindrical base 2, thermal stabilization is accelerated and thus thermal expansion is suppressed. Thermal drift, therefore, is not easily transmitted to needle 5. Since needle 5 is not susceptible to vibration or thermal drift, micro manipulation technology is upgraded and this can provide contributions in microelectronics, biotechnology, and medical care.

A double manipulator can be formed by configuring the 3-DOF manipulator of FIG. 1 into two-finger form. The use of any number of such 3-DOF manipulators also enables application to micro-operations such as positioning, handling, cutting, and bonding very small objects, and to an accurate positioning stage mechanism.

In addition, according to this embodiment, since the manipulator can be manufactured by cutting and folding a thin plate by use of a simplified press, machining is simplified and manufacturing costs can be reduced. Furthermore, compact fabricating can be simplified and the manipulator itself can be reduced in size.

Although, in this embodiment, piezoelectric devices are used as actuators 61, the embodiment is not limited by this and enables the use of other devices such as Bimorph-type piezoelectric devices. The manipulator can likewise be operated by attaching Bimorph-type piezoelectric devices to the members 6*e* of the arm portions 6' and pushing the links upward.

Figure 7:
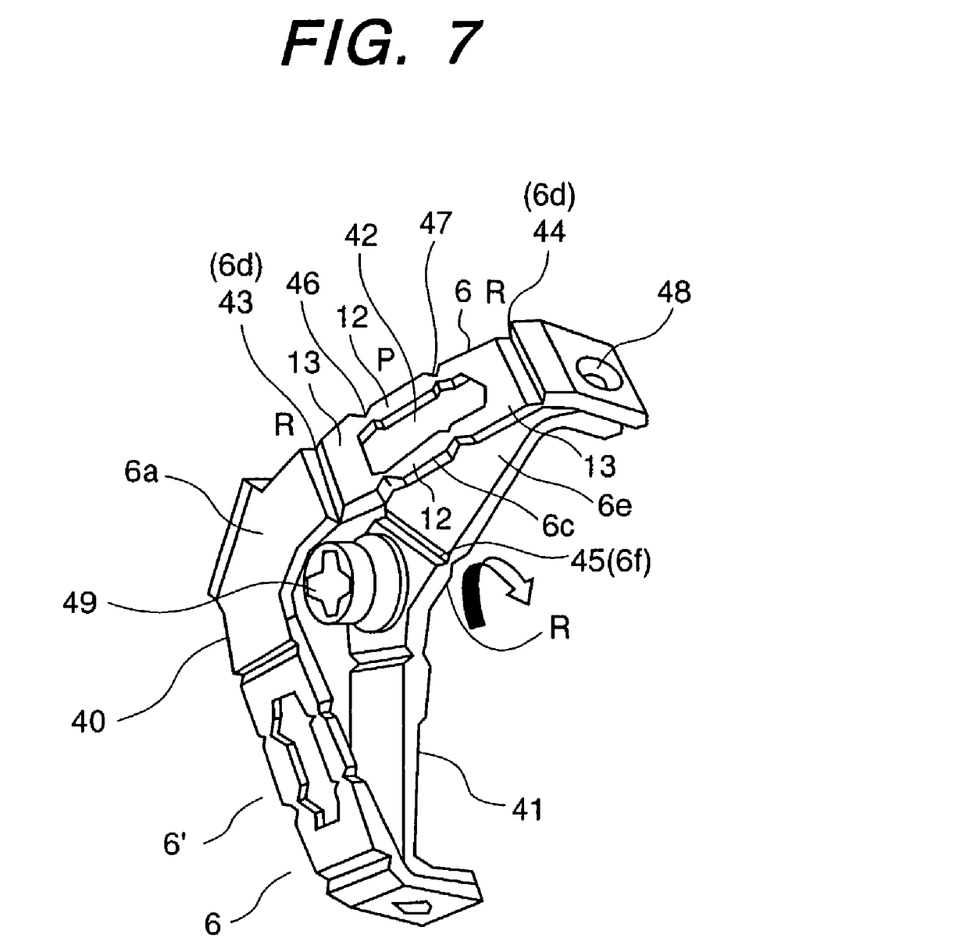
FIG. 7 is a diagonal view showing the link mechanisms of the micro manipulator pertaining to a second embodiment of the present invention.

FIG. 7 is a diagonal view showing only the link mechanisms 6 of the manipulator pertaining to another embodiment of the present invention. Since the construction of sections other than the link mechanisms is the same as in the embodiment of FIG. 1, other sections are neither described nor shown in any figure.

Although, in the previous (first) embodiment, all three link mechanisms 6 consist of a single cut and folded plate, the three link mechanisms 6 in this (second) embodiment consist of the plate 40 and 41 that were fabricated after being split into upper and lower sections. Arm portions 6' extend in three directions from the centers of both the upper plate 40 and lower plate 41, and upper plate 40 and lower plate 41 constitute the upper half and lower half, respectively, of the three link mechanisms 6. Upper plate 40 and lower plate 41 have a screw hole (connecting hole) 48 at the middle position of the entire arm portion 6' (the entire arm section of the upper and lower plates) and are connected using screws (not shown in the figure).

In this embodiment, the link mechanisms 6 are fixed to base 2 (not shown in the figure) by use of screws 49.

Arm portion 6' of each link mechanism existing when upper plate 40 and lower plate 41 are connected is described below. For each arm portion 6' in this embodiment, as in the embodiment of FIG. 1, the hinge portions 6b, 6d, and 6f that can be regarded as revolving joints R are formed longitudinally at both ends of each arm portion 6' (positions denoted by numerals 43 and 45, in other words, one end facing the movable plate 6a and one end facing the installation side of the base 2) and at the middle position (position denoted by numeral 44) of the arm portion 6'. A parallelogrammatic link 6c that can be regarded as a prismatic joint P is also formed between longitudinal end 43 and middle portion 44.

In this embodiment, the hinge portions 6b, 6d, and 6f constituting the revolving joints R are composed of, instead of the slits shown in FIG. 1, the thin portions (for example, cross-sectionally V-shaped grooves) extending in the lateral direction of the arm portion 6'.

Also, at the parallelogrammatic link 6c operating as a prismatic joint P, the single pair of joints 13 are connected via hinge portions (constrictions) 46 and 47 by a connecting link portion 12.

The above construction provides functions similar to those of the micro manipulator shown in FIG. 1, and enables end effector 3-DOF accurate positioning control to be implemented with three link mechanisms.

For the above-described embodiments, the link mechanisms 6 can be manufactured by introducing the etching technology for the micro-processing of semiconductors (for example, photoetching), instead of employing the cutting and folding method that uses a press. When the former method is used, the link mechanisms will be made of a material such as silicon.

[Effects of the Invention]

As set forth above, the use of a 3-DOF micro manipulator based on the present invention enables end effector 3-DOF accurate positioning control to be implemented with three link mechanisms by utilizing the characteristics that parallel 3-DOF operation becomes the main operation in micro-operations.

Hereby, a micro manipulator easy to operate and capable of executing accurate positioning can be obtained at low costs.

According to the present invention, when a sheetmetal integral fabricating method that enables easy machining and inexpensive manufacture is used as a tool, micro-link mechanisms can also be formed. In addition, a micro-machine can be assembled. Furthermore, application as the micro-displacement mechanism for revolving-joints and direct-acting joints is possible.

What is claimed is:

1. A micro manipulator equipped with three link mechanisms for connecting a base and an end effector, wherein said three link mechanisms are produced by fabricating a sheet of flexible metal plate and are formed with
   plate-like arm portions provided radially at the periphery of said end effector,
   flexure hinge portions that are positioned at both ends and a middle position of each said arm portion in its longitudinal direction and act as revolving joints if the amounts of displacement of the flexure hinge portions are very small, and
   a link element that is positioned between one end and middle position in the longitudinal direction of each said arm portion and act as a parallelogrammatic joint if the amount of displacement of the link element is very small,
   wherein said flexure hinge portions are formed with slits in the lateral direction of each of said arm portion.

2. The micro manipulator according to claim 1, wherein each said link mechanism is produced by either punching and folding or micro-etching the metal sheet.

3. The micro manipulator according to claim 1, wherein said three link mechanisms are produced by fabricating said metal sheet into independent upper and lower plates, both the upper and lower plates having an arm portion, both arm portions extend in three directions from the respective centers, and said upper plate and said lower plate further forming the upper half and lower half, respectively, of the three link mechanisms, and both plates are connected.

4. The micro manipulator according to claim 3, wherein piezoelectric elements for assigning driving force to said three link mechanisms are provided in said base.

5. The micro manipulator according to claim 4, wherein said piezoelectric elements are preloaded so that no clearances are generated on the contact surfaces of the piezoelectric elements with respect to said three link mechanisms.

6. The micro manipulator according to claim 1, wherein piezoelectric elements for assigning driving force to said three link mechanisms are provided in said base.

7. The micro manipulator according to claim 6, wherein said piezoelectric elements are preloaded so that no clearances are generated on the contact surfaces of the piezoelectric elements with respect to said three link mechanisms.

8. The micro manipulator according to claim 1, wherein said three link mechanisms comprise three revolving joints and one parallelogrammatic joint.

* * * * *